(12) United States Patent
Agrawal et al.

(10) Patent No.: US 9,407,470 B2
(45) Date of Patent: Aug. 2, 2016

(54) ELEMENTS TO COUNTER TRANSMITTER CIRCUIT PERFORMANCE LIMITATIONS

(71) Applicant: Lattice Semiconductor Corporation, Portland, OR (US)

(72) Inventors: Vinayak Agrawal, Hyderabad (IN); Namrta Sharma, Hyderabad (IN); Deepak Ramapuram, Hyderabad (IN)

(73) Assignee: LATTICE SEMICONDUCTOR CORPORATION, Portland, OR (US)

( * ) Notice: Subject to any disclaimer, the term of this patent is extended or adjusted under 35 U.S.C. 154(b) by 0 days.

(21) Appl. No.: 14/812,220

(22) Filed: Jul. 29, 2015

(65) Prior Publication Data
US 2015/0333932 A1 Nov. 19, 2015

Related U.S. Application Data

(62) Division of application No. 13/984,018, filed as application No. PCT/IB2013/000409 on Mar. 14, 2013, now Pat. No. 9,130,794.

(51) Int. Cl.
*H03K 19/0175* (2006.01)
*H04L 25/02* (2006.01)
*H04B 1/04* (2006.01)

(52) U.S. Cl.
CPC ............... *H04L 25/028* (2013.01); *H04B 1/04* (2013.01); *H04L 25/026* (2013.01)

(58) Field of Classification Search
CPC . H04L 25/272; H04L 25/028; H04L 25/0292; H04L 7/0008; H04L 25/0266; H04L 25/0282; H04L 25/0286; H04L 25/0274; H04L 25/0278; H04L 25/0294; H03K 19/01812; H03K 2005/00208; H03K 5/151; H03K 19/00346

See application file for complete search history.

(56) References Cited

U.S. PATENT DOCUMENTS

| | | | | |
|---|---|---|---|---|
| 8,373,451 | B1* | 2/2013 | Ferguson | H03K 19/00 327/108 |
| 2008/0048736 | A1* | 2/2008 | Ruy | H03F 3/45183 327/108 |
| 2010/0244930 | A1* | 9/2010 | Ogawa | H01L 27/0629 327/437 |
| 2010/0253389 | A1* | 10/2010 | Luich | H03K 19/018528 326/73 |
| 2011/0109393 | A1* | 5/2011 | Adamski | H03F 1/0216 330/295 |

* cited by examiner

*Primary Examiner* — Jany Richardson

(57) ABSTRACT

Embodiments of the invention are generally directed to elements to counter transmitter circuit performance limitations. An embodiment of an apparatus for driving data on a differential channel including a first output terminal and a second output terminal includes a differential driver circuit; and a first pre-driver and a second pre-driver, where each pre-driver has an output, wherein the first output terminal of the apparatus is coupled to the output of the first pre-driver, and the second output terminal of the apparatus is coupled to the output of the second pre-driver, where each pre-driver includes one or more capacitors, a first end of each capacitor being connected to the output of the pre-driver and a second end of each of the capacitors being connected to a sub-pre-driver circuit.

12 Claims, 17 Drawing Sheets

ELEMENTS TO COUNTER TRANSMITTER CIRCUIT PERFORMANCE LIMITATIONS

CROSS REFERENCE TO RELATED APPLICATIONS

This application is a divisional of U.S. application Ser. No. 13/984,018, filed on Aug. 6, 2013, which is a National Phase Entry of PCT App. No. PCT/IB2013/000409, filed on Mar. 14, 2013, both of which applications are incorporated in their entireties herein.

TECHNICAL FIELD

Embodiments of the invention generally relate to the field of data transmission, and, more particularly, to elements to counter transmitter circuit performance limitations.

BACKGROUND

Signal transmissions have continued to increase in speed as technology has advanced. However, in the transmission of signals between devices or elements, there are limitations on transmitter performance caused by certain circuit characteristics.

In a first example, inductances of device packages, generally caused by the bond wire connections, operate to cause variation in signal delay, and thus to create data jitter. The data jitter may limit the speed of operation of a transmitter.

In a second example, an RC (Resistor-Capacitor) time constant of a transmitter operates to limit performance, where the resistance is the terminal resistance of the connection and the capacitance is the mainly comprised of package capacitance and any board capacitance.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
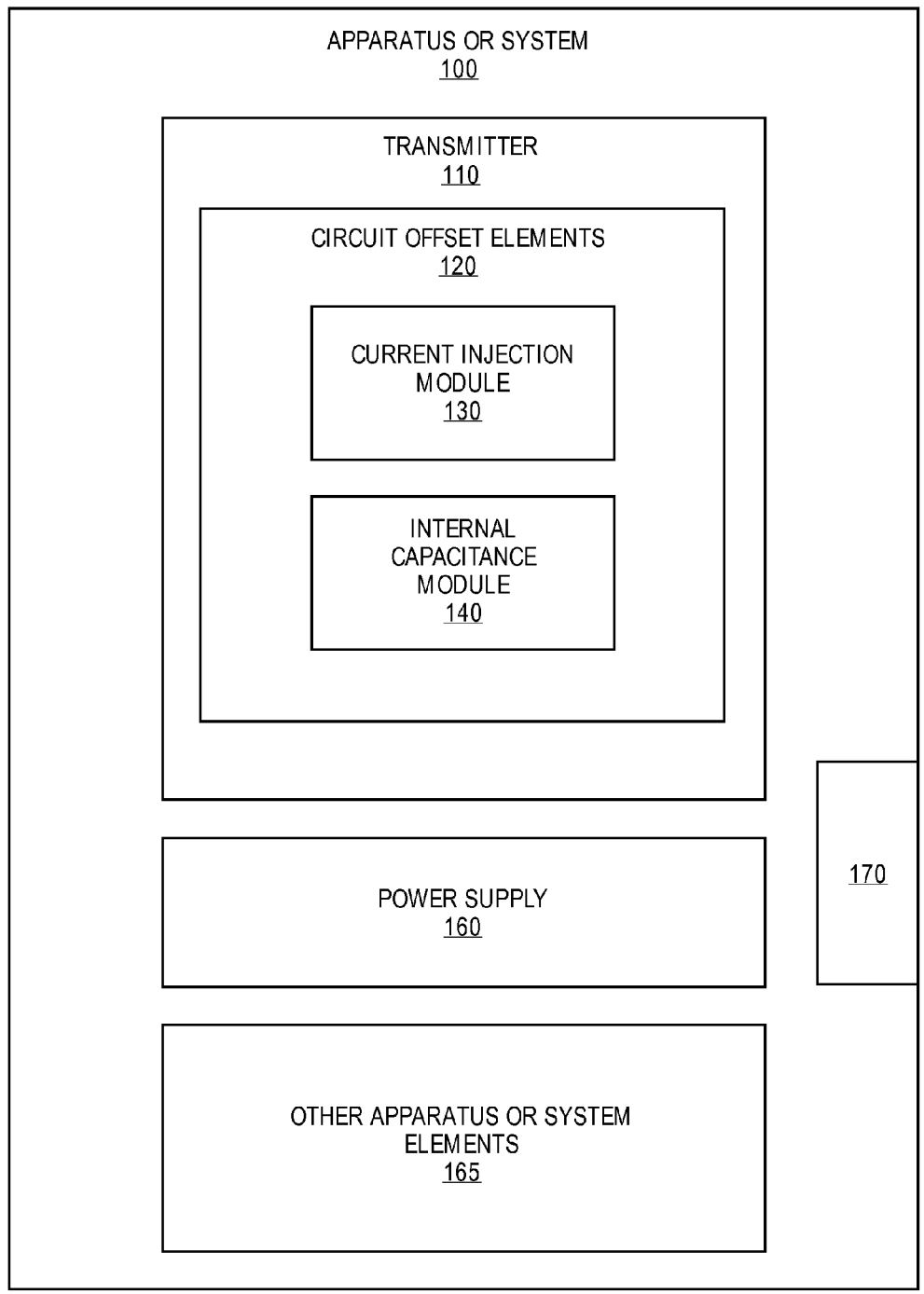
FIG. 1 illustrates an embodiment of an apparatus or system including circuit elements to counter transmitter circuit effects.

Embodiments of the invention are generally directed to elements to counter transmitter circuit performance limitations. In a first aspect of the invention, an embodiment of an apparatus for driving data on a differential channel includes a first output terminal and a second output terminal includes a differential driver circuit; and a first pre-driver and a second pre-driver, where each pre-driver has an output, wherein the first output terminal of the apparatus is coupled to the output of the first pre-driver, and the second output terminal of the apparatus is coupled to the output of the second pre-driver, where each pre-driver includes one or more capacitors, a first end of each capacitor being connected to the output of the pre-driver and a second end of each of the capacitors being connected to a sub-pre-driver circuit.

In a second aspect of the invention, an apparatus includes a transmit buffer and a complimentary buffer on an integrated circuit (IC) chip, wherein the transmit buffer is coupled to a electrical channel comprising two wires outside the integrated circuit, and the complimentary buffer is coupled to two banks of capacitors on the chip, and wherein an input of the transmit buffer is coupled to a data input on the chip, and an input of the complementary buffer is coupled to a generated data that is calculated using an algorithm from the data input to the transmit buffer. The algorithm includes, in a one bit per clock cycle operation, inverting every other bit in the data stream, and, in a multiple bits per cycle scenario, either inverting all even bits or inverting all odd bits of an input data word.

In a third aspect of the invention, a method includes obtaining a capacitance value for two banks of capacitors of an integrated circuit (IC) chip to provide current injection for a complementary driver for a differential data driver, wherein the IC chip includes a transmit buffer and a complementary buffer, the complementary buffer being coupled to the two banks of capacitors, each bank of capacitors including a plurality of capacitors, where each of one or more of the plurality of capacitors is coupled with a programmable device; and updating a state of each of the programmable devices to establish the capacitance of two banks of capacitors, wherein the state of each programmable either enables or disables a connection of an associated capacitor. The state of each of such programmable devices can be updated when the transmit buffer is functional and sending data; and the programmable devices can change states only when the transmit data contains at least two sequential bits of logic '0' or two sequential bits of logic '1'.

DETAILED DESCRIPTION

Embodiments of the invention are generally directed to elements to counter transmitter circuit performance limitations.

As used here:

"Data jitter" or "jitter" means undesired deviation of timing of signals in an apparatus or system.

In some embodiments, an apparatus, system, or method circuit provides elements to counter transmitter circuit limitations. In some embodiments, the elements including programmable elements to adjust transmitter performance.

In data transmission systems, one of the factors that affects the BER (Bit Error Rate) of an apparatus or system is timing jitter, also referred to as data jitter, with a major cause of timing jitter being variation in power supply. The data jitter limits the operation of a transmitter. In addition, a transmitter is further limited by the RC time constant of a circuit.

In some embodiments, an apparatus, system, or method includes elements for current injection to offset current variation in a circuit as signals are toggled, and thus to reduce data dependent jitter. In some embodiments, the apparatus, system, or method reduces the rise and fall times of the output signal of a current mode driver, such as an HDMI™ (High-Definition Multi-Media Interface) driver, and thus increases the speed to which such a driver may be operated.

In some embodiments, an apparatus, system, or method includes the provision of internal capacitance to modify the effective capacitance seen at an output, and thus to affect the RC time constant of the circuit. In some embodiments, an apparatus, system, or method provides for reducing the effective capacitance seen at the output. In some embodiments, an internal capacitance (Cint) is utilized to provide charge to the external capacitance (C) when the output node should go high, and subtract charge when the output node should go low, the internal capacitance providing a significant portion of charge/discharge current.

FIG. 1 illustrates an embodiment of an apparatus or system including circuit elements to counter transmitter circuit effects. In some embodiments, an apparatus or system 100 includes transmitter 110, where the apparatus or system 100 may be, for example, an audio visual data signal source and the transmitter 110 may be, for example, an HDMI compatible transmitter. In some embodiments, the apparatus or system 100 may be a computer chip. In some embodiments, the transmitter 110 includes one or more circuit offset elements 120 to affect circuit performance. The apparatus or system 100 further includes a power supply 160 to supply power for the apparatus or system and one or more other elements 165, which may, for example, include a receiving element to receive data, which may include data to be transmitted by the transmitter 110. The apparatus or system further includes one or more ports 170 for the transmission of data, reception of data, or both. The ports 170 may include one or ports for the transmission of data by the transmitter, such as, for example, an HDMI compatible port for the transmission of HDMI data by the transmitter 110.

In some embodiments, the circuit offset elements 120 may include elements for current injection, as illustrated by a current injection module 130, to offset current variation in a circuit as signals are toggled, and thus to reduce data dependent jitter.

In some embodiments, the circuit offset elements 120 may include elements for reduction of effective capacitance at an output of the transmitter 110, as illustrated by the internal capacitance module 140. In some embodiments, the internal capacitance operates to modify the effective capacitance seen at an output, and thus to affect the RC time constant of the circuit. In some embodiments, an apparatus, system, or method provided for reducing the effective capacitance seen at the output. In some embodiments, an internal capacitance (Cint) is utilized to provide charge to the external capacitance (C) when the output node should go high, and subtract charge when the output node should go low.

Figure 2:
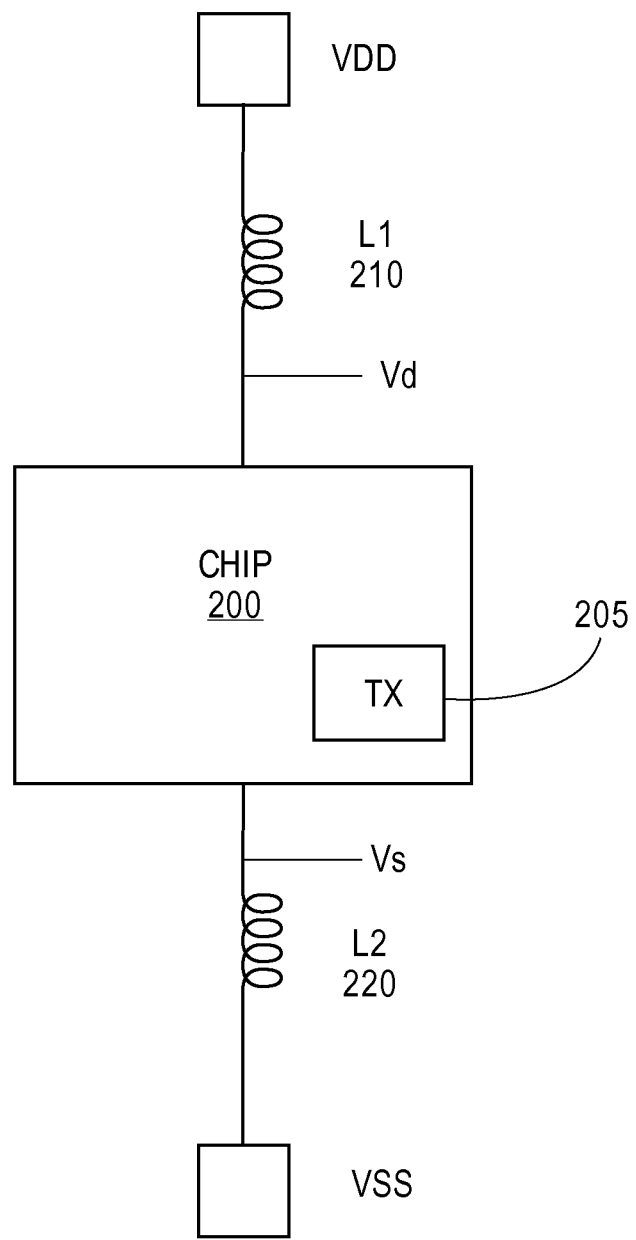
FIG. 2 is an illustration of power connections of a chip.

FIG. 2 is an illustration of power connections of a chip. A power supply on a chip 200, which may provide Vd and Vs voltages, is connected to the outside world (such as supply voltages VDD and VSS) through connections that include certain inductance, illustrated as L1 210 and L2 220. The chip includes a transmitter 205. For example, a power supply inside a chip is connected to an outside power supply through bond wire, where the bond wire adds inductance to the path of the power supply.

Transient currents on a chip cause transient voltage drop across the inductance, such as the inductance added by the connection to the power supply. Variation in the supply voltage results in variation in delay of cells, which then results in jitter. The jitter may be reduced through a reduction of inductance, but the reduction of the inductance will increase the cost of manufacturing a device. Thus, there is a tradeoff between jitter (creating reduced performance) and bond pad wire inductance (in terms of increased cost of production).

In this illustration, various blocks on the chip 200 draw a transient current 'Id(t)' from the power supply, thus the supply voltage 'Vd(t)' also varies. In operation, delay of cells driven by 'Vd–Vs' also varies with the variation in supply voltage. This variation in the delay causes data jitter for the chip 200, and the data jitter reduces the performance of the transmitter. In a digital circuit, current generally arrives in peaks, with each such peak resulting in transient current flows.

Figure 3:
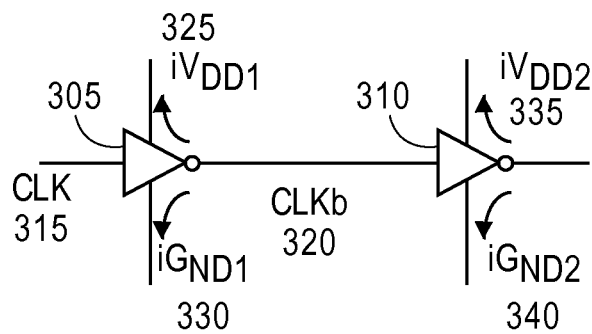
FIG. 3 illustrates current flows for devices with signal transitions.
Figure 3:
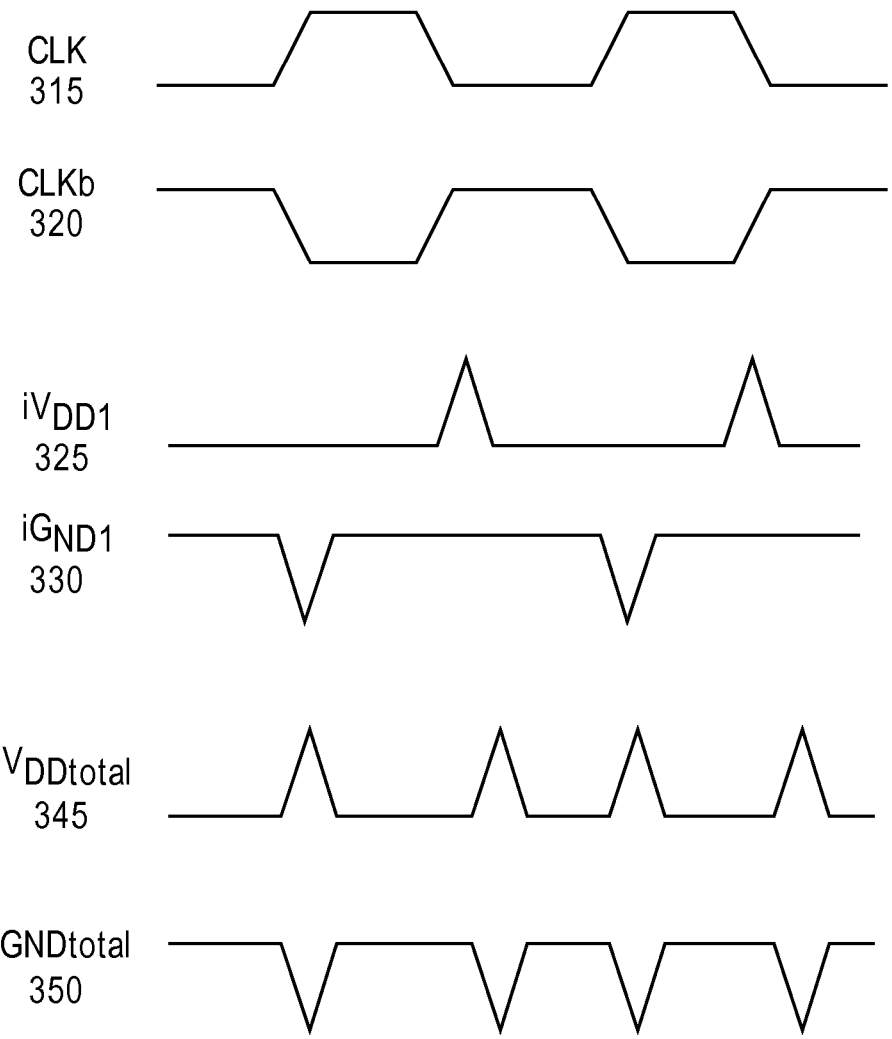

FIG. 3 illustrates current flows for devices with signal transitions. In a digital circuit, current arrives in bursts or peaks. In this example, a first inverter 305 receives current from VDD ($iV_{DD1}$ 325) on every rising edge of input CLK 315, while the inverter 305 provides current into GND ($iG_{ND1}$ 330) at every falling edge of the input CLK 315. Also illustrated is a second inverter 310 receives current from VDD ($iV_{DD2}$ 335) on every rising edge of input CLKb 320 (generated by the first inverter 305), while the second inverter 310 provides current into GND ($iG_{ND2}$ 340) at every falling edge of the input CLKb 320. Overall the buffer shows a peak on both VDD current ($iV_{DDtotal}$ 345) and GND current ($iV_{GNDtotal}$ 350) every time there is a transition.

Figure 4:
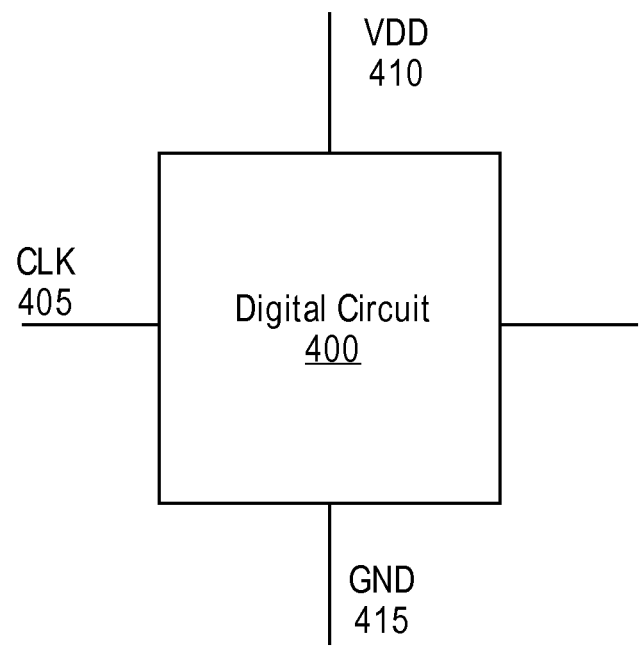
FIG. 4 illustrates current flows for a clocked digital device.
Figure 4:
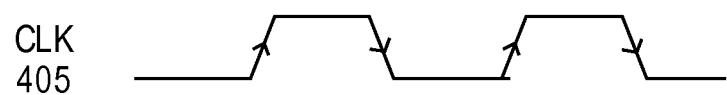
Figure 4:
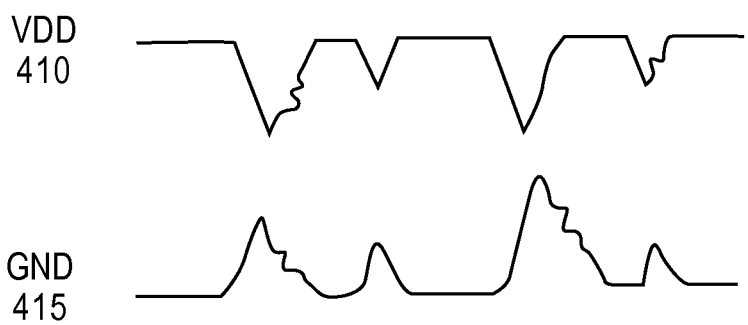

FIG. 4 illustrates current flows for a clocked digital device. As illustrated, a digital circuit 400 receives a clock signal CLK 405, with connections to VDD 410 and GND 415. Clocked digital circuits, such as digital circuit 400, in general consume most of their power on rising edges on the clock. There is usually also minor activity on falling edges of the clock. As a result, every time the clock rises or falls, supply dip and ground bounce occurs inside the chip. The major reason for the supply dip and ground bounce is the inductance on the package of the digital circuit 400. In the absence of inductance, there would be essentially no supply bounce as external power supplies could provide current instantly.

Figure 5:
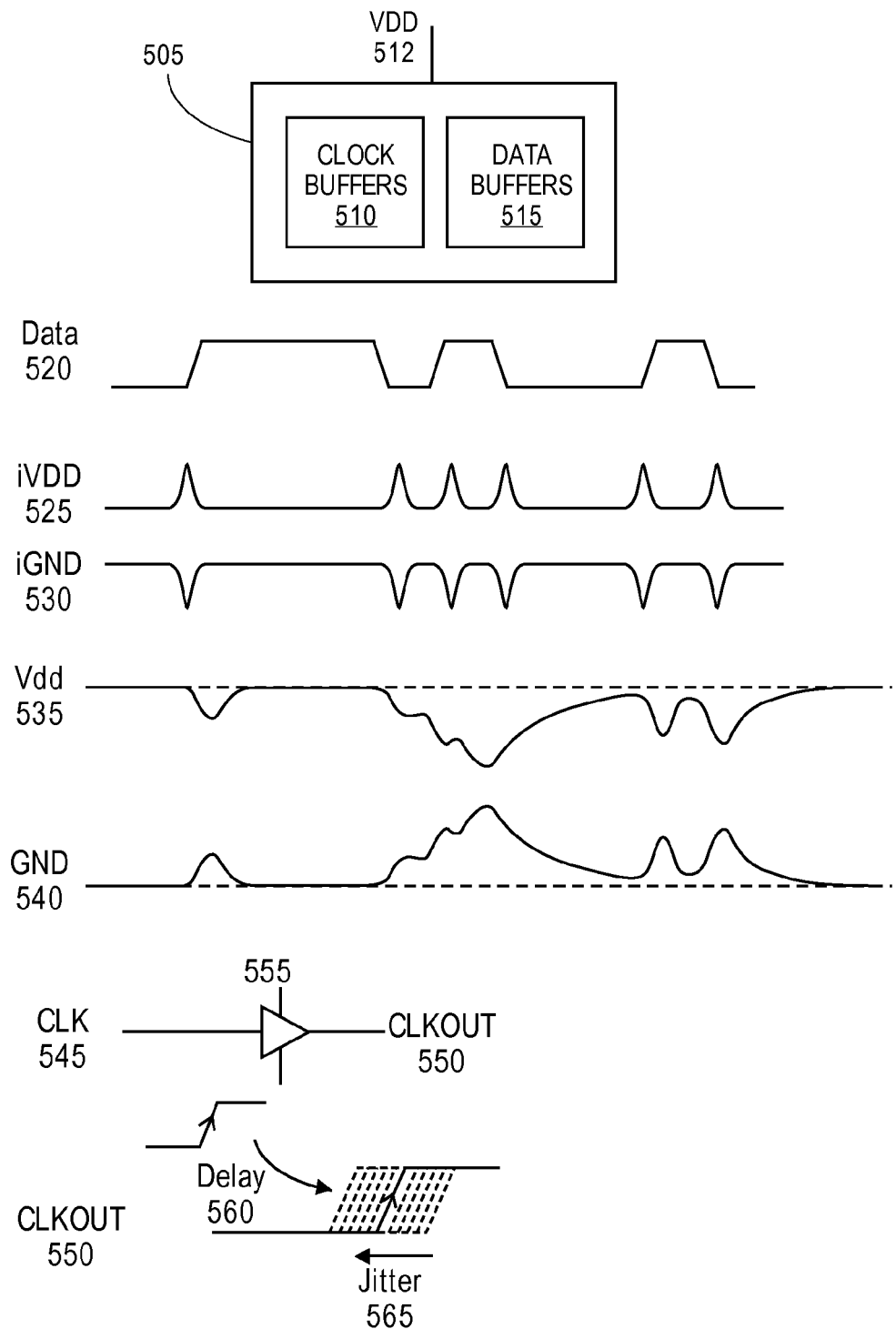
FIG. 5 illustrates signal timing for an apparatus or system.

FIG. 5 illustrates signal timing for an apparatus or system. In this illustration, buffers 500 include clock buffers 510 and data buffers 515 coupled to voltage VDD 512. In clocked data buffers driving large loads, most of the current actually flows when data 520 toggles. If a driver is a differential driver (such as, for example, HDMI drivers) each time data 520 toggles there is a current peak on both $i_{VDD}$ 525 and $i_{GND}$ 530. These current peaks then result in supply noise that is closely dependent on data, as shown in Vdd 535 and GND 540. As shown in FIG. 5, the effective supply voltage seen by a buffer 555 (receiving CLK 545 and producing CLKOUT 550) varies at each data transition. As a result, the delay 560 that is generated varies with the data toggling. This variation in delay generates data jitter 565.

For HDMI transmitters and other similar differential current-mode transmitter circuits, the data drivers and pre-drivers constitute very large loads on a chip. For single ended drivers and for pseudo-differential drivers, off chip loads are also relevant. All drivers as a result suffer from data-activity induced supply noise and the resultant jitter. Even for fully differential drivers, significant noise is generated due to digital stages (such as serializers) to cause enough data-dependent supply noise that then causes heavy data jitter.

Conventional packages generally have parasitic inductance that is too high to allow current waveforms changing faster than 100 MHz. The supply/ground cutoff for most packages is generally approximately 100-200 MHz. For 3 Gbps links, an idealized cutoff would be at least 3 GHz to eliminate supply ripple. However, this is not possible with the existence of significant parasitic inductance.

Once a data rate is appreciably more than package's supply cut-off frequency, the supply induced jitter becomes essentially constant. For example, 1 Gbps will generate essentially the same amount of jitter as 3 Gbps with regular packages. However, at higher data rates the margin for jitter is smaller.

The variation in the supply voltage has an impact on the output of a driver. The output of the driver is connected to the pin through an inductance.

Figure 6:
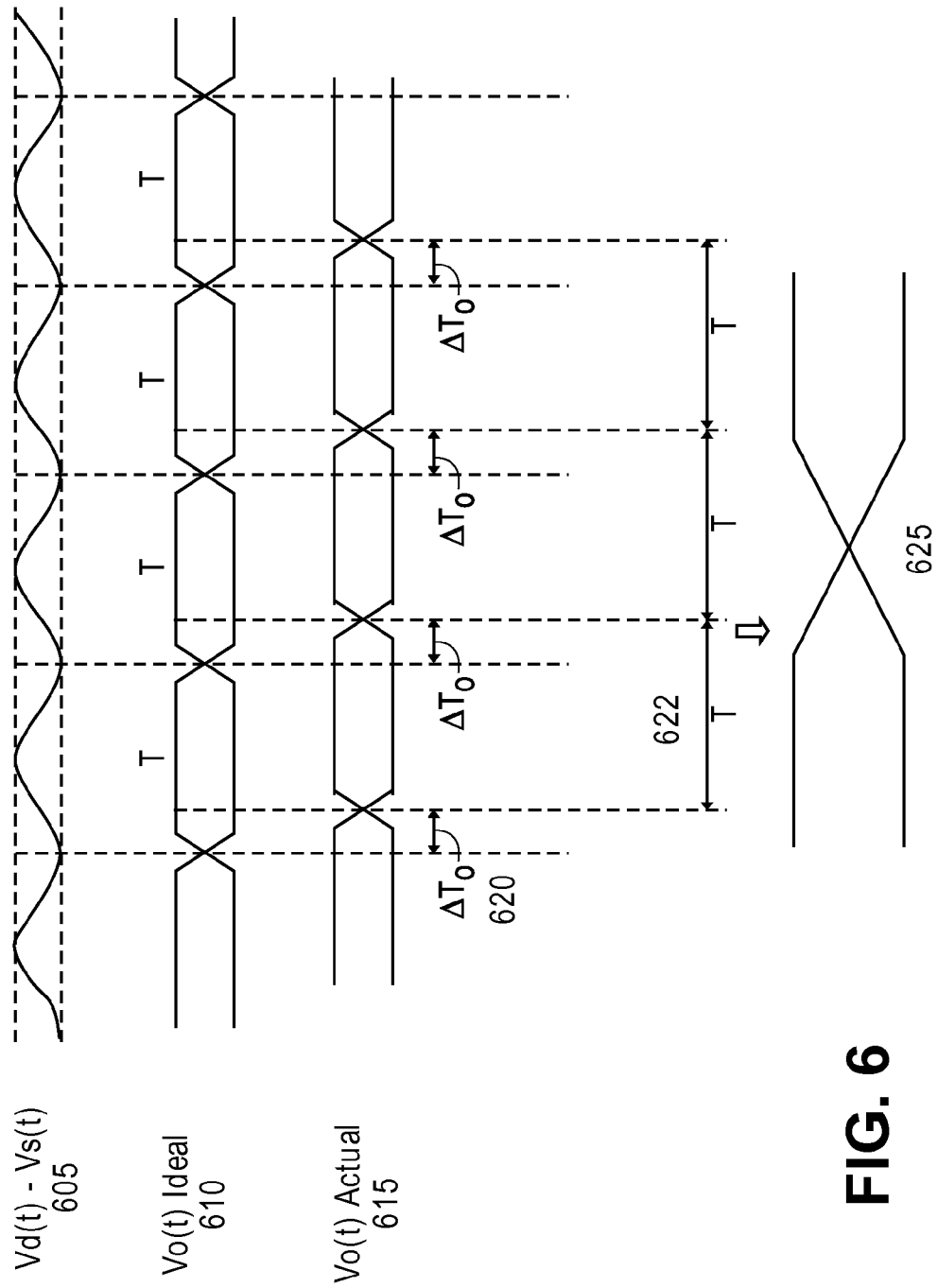
FIG. 6 illustrates signal timing for an embodiment of an apparatus or system.

FIG. 6 illustrates signal timing for an embodiment of an apparatus or system. Because 'Vd(t)−Vs(t)' varies with 'vd(t)', delay of the driver also varies with 'ΔT(t)', which is correlated to 'vd(t)'. Thus, the delay of the driver will be different at each transition, and the eye diagram of the output of the driver in this case will have jitter. If it can be assured that at every transition of a driver output, 'Vd(t)−Vs(t)' 605 has a same value, then, in comparison to an ideal voltage 610, each transition of actual voltage 615 would be delayed by same 'ΔT0' 620. Under these circumstances, the period of the signal would still be 'T' at all transitions 622, and thus jitter is largely reduced or eliminated 625.

In some embodiments, in order to provide low jitter, a power supply across a driver provides a value of 'Vd(t)−Vs(t)' that has the same value at each transition, thus providing low jitter. While LdI/dT drop may not be eliminated, if the drop is same each time the inverter switched, then the delay of the inverter would remain essentially the same in each cycle.

In some embodiments, an apparatus or system allows reduction in timing jitter without requiring a low inductance bond wire package. In some embodiments, the maintenance of the drop is achieved by injecting an estimated amount of current at times when data (or other large loads) are not switching on to the supplies.

In some embodiments, a same 'Vd(t)−Vs(t)' may be achieved at all transitions by the following:

(1) The output driver may be made differential. With a differential output driver, when one driver is drawing power from 'Vd', the differential counterpart is sinking current to 'Vs(t)'. Thus, if the inductance on Vd and Vs is the same, the change in Vd and Vs will be same, thus maintaining 'Vd(t)−Vs(t)' constant.

(2) Because (1) above requires both the drivers to be matched exactly, another pin would be needed, to provide the same load to the complementary driver.

(3) The extra pin may be eliminated by providing a bank of capacitors to the complementary driver. The exact value of capacitance to be switched may be made programmable. During testing, the capacitance that gives minimum jitter may be chosen.

(4) Instantaneous voltage on the power supply depends on the Data being driven. If the circuit ensures that at every clock edge, the same or similar amount of current is drawn form the supply, the supply will be nearly the same for every transition.

(5) To achieve (4), a complementary data path may be added that toggles when the main data path does not toggle.

Figure 7:
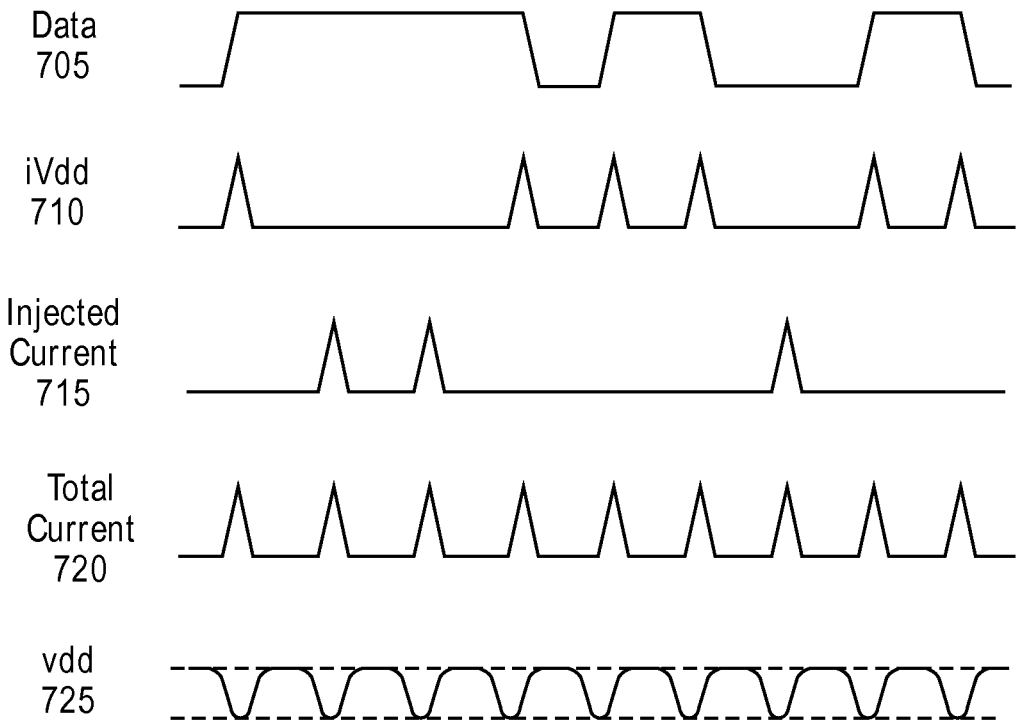
FIG. 7 illustrates signal timing for an embodiment of an apparatus or system utilizing current injection.
Figure 7:
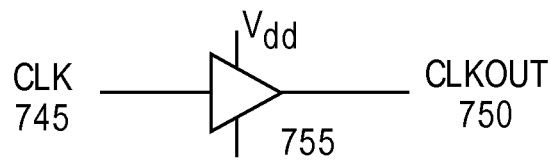
Figure 7:
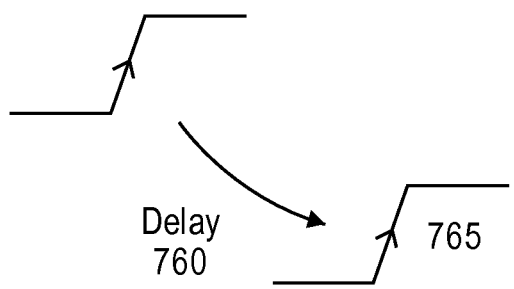

FIG. 7 illustrates signal timing for an embodiment of an apparatus or system utilizing current injection. In some embodiments, the data 705 and resulting iVDD current 710 are addressed with an injected current 715 at points when there is no transition, resulting in a regular pattern for total current 720. Comparing the FIG. 7 with FIG. 5, while a circuit will still have a ripple on the supply voltage vdd 725 (and also on GND, which is not shown), each time the data toggles, the voltage seen by the inverter 755 (receiving CLK 745 and producing CLKOUT 750) will be essentially the same. As a result the inverter delay 760 (and other delays in the system) will not vary and jitter will be largely reduced or eliminated 765.

It is noted that the injection of current exacts a certain power penalty in operation. However, complete or near complete elimination of jitter may not be required in all cases. For example, for a link that is designed to work at both 3 Gbps and 2 Gbps, a system may save power by intentionally providing imperfect cancellation of supply noise.

Figure 8:
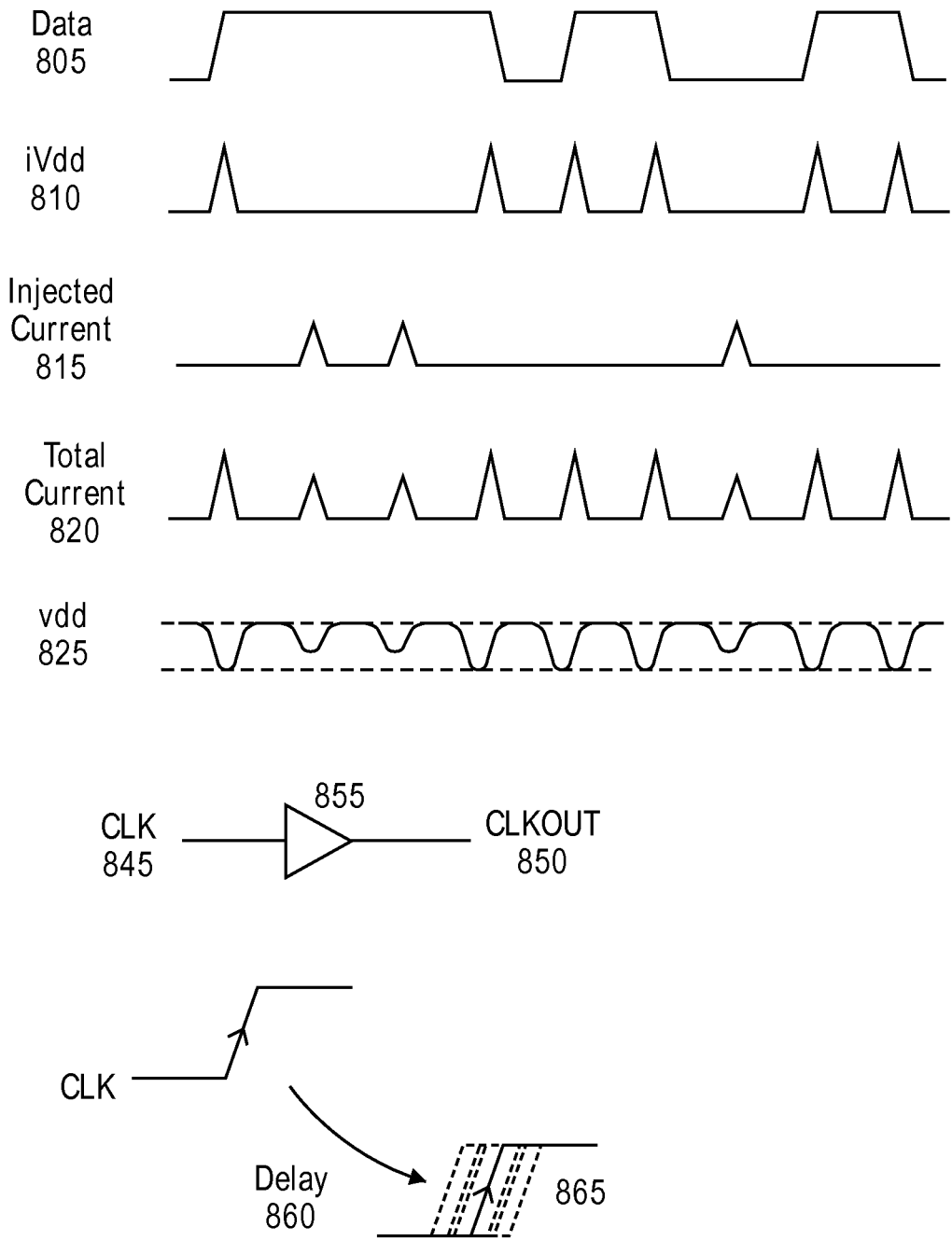
FIG. 8 illustrates signal timing for an embodiment of an apparatus or system utilizing current injection.

FIG. 8 illustrates signal timing for an embodiment of an apparatus or system utilizing current injection. In some embodiments, the data 805 and resulting iVDD current 810 is addressed with an injected current 815 at points when there is no transition, resulting in a regular pattern for total current 820. However, as illustrated in FIG. 8, the injected current 815 may be less than the normally occurring pulses. The circuit will have a varying ripple on the supply voltage vdd 825 (and on GND, which is not shown), each time the data toggles. The voltage seen by the inverter 855 (receiving CLK 845 and producing CLKOUT 850) is not equalized as in FIG. 7 and there is some variation in signal delay 760, but the variation is reduced in comparison with a circumstance in which there is no current injection. While this may not completely cancel out the jitter 765, it will reduce the jitter substantially compared to an uncompensated case.

In some embodiments, an implementation may include a "dummy driver" circuit running parallel to the normal circuits, but that is fed data that toggles when the normal data does not. In such circuit, it is certain that at least one of the drivers will toggle, and thus every cycle will have a signal edge. If the drivers and the loads were identical, then the current spike generated in each clock cycle would be same, irrespective of data, and delays will be same in each cycle, the essentially eliminating jitter.

In some embodiments, in practice, the current injection may be used in only a limited part of a circuit. For example, if a clean power supply (a supply having little noise) is available for clock distribution (such as, for example, by not sharing the package pins between clock circuits with other circuits), then the major jitter generating circuit portions may be identified and the current injection being used only on the identified paths.

Figure 9:
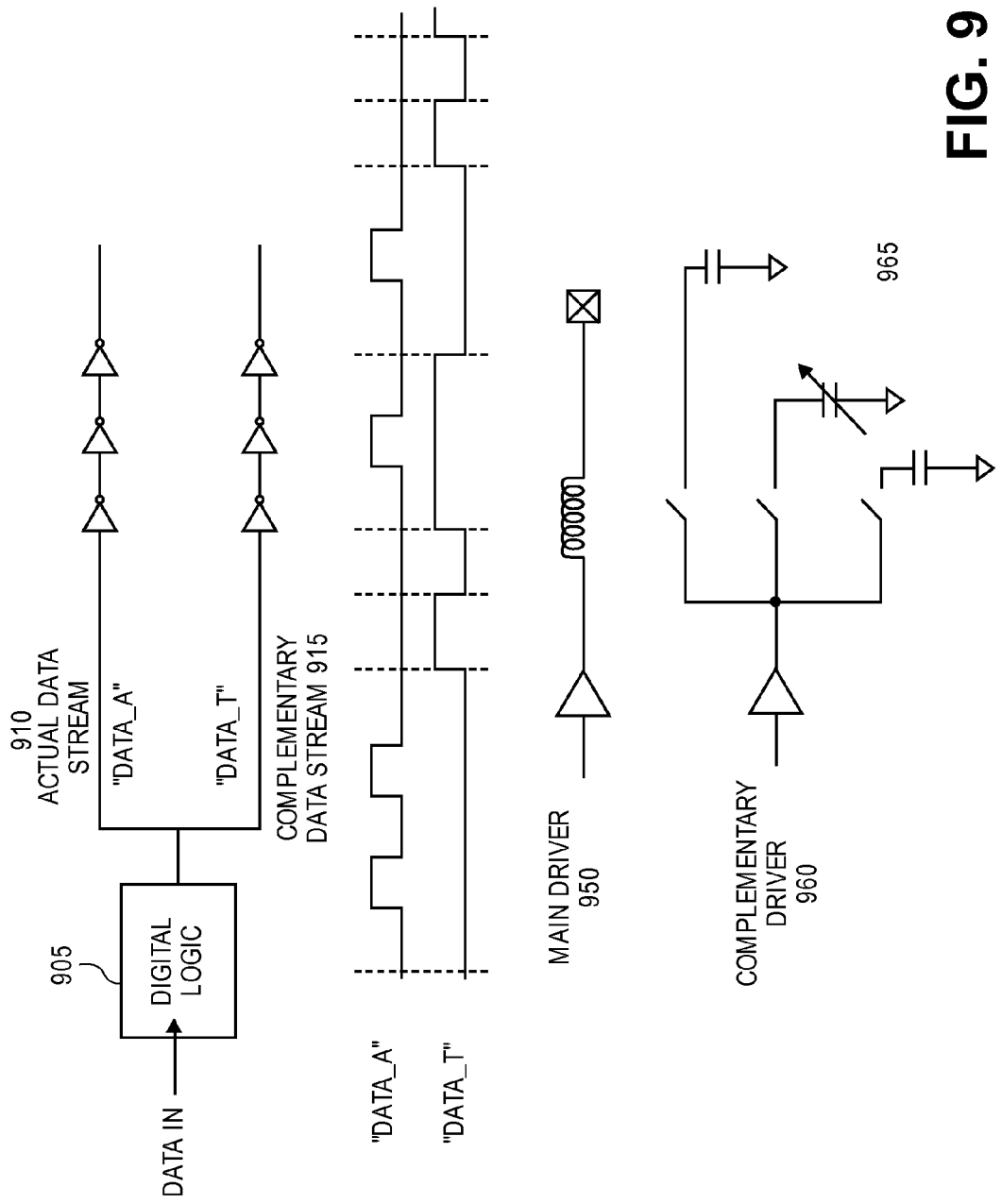
FIG. 9 illustrates an embodiment of an apparatus or system including current injection.

FIG. 9 illustrates an embodiment of an apparatus or system including current injection. FIG. 9 is a simplified illustration including a single driver. In practical operation, circuits are more complex than a single driver. In this illustration, data in is received at digital logic 905, which includes a path for an actual data stream 910 (Data_A). In some embodiments, in order to achieve the same or similar current consumption for each cycle, a path for a complementary data stream 915 (Data_T) may be added, where the complementary data path toggles when the main data path does not toggle.

In some embodiments, if the current spikes are to match precisely, not only are the drivers required to be matched, but their loads would also be required to be matched. For circuits that are entirely on chip this is feasible, but for single-ended (or pseudo-differential) pad drivers, the load will depend on factors that are generally beyond a circuit designer's control, such as PCB (printed circuit board) components and similar elements.

In some embodiments, an apparatus or system includes a main driver 950 and a complementary driver 960 to provide current injection when the main driver 950 does not toggle. In some embodiments, an apparatus, system, or process provides a bank of capacitors 965 to the complementary driver 960. In some embodiments, the value of capacitance to be switched may be made programmable. In some embodiments, during PCB (printed circuit board) testing, the capacitance that provides a minimum jitter value may be chosen.

In some embodiments, an additional benefit may be provided in that incomplete cancellation of supply noise may be provided at lower data-rates to adjust the power/speed tradeoff by reducing power consumption. In some embodiments, provision of current insertion may then reduce the size of on-chip D-cap (decoupling capacitance) needed.

In some embodiments, the inclusion of a complementary driver including a programmable load may in particular be useful for drivers that rely on single ended drivers, such as SPMT (Serial Port Memory Technology), high speed CBUS (Control Bus) implementation in MHL™ (Mobile High-definition Link), and others.

In some embodiments, a process allows for post PCB production optimization. Based on the package that customers actually utilize, the package can be selectively turned to optimize or adjust the jitter and power consumption. In some embodiments, a current injection circuit may be turned off at lower speeds to save power.

There may be other blocks on the chip that do not toggle at the frequency at which the data is being transmitted. If only the blocks that toggle at the frequency of transmission of data are driven from one supply, the supply variation will be periodic with the period determined by the frequency of data transmission. This will reduce jitter as explained above. There may or may not be any DC current drawn from this supply.

In some embodiments, an apparatus, such as an integrated circuit (IC) chip, includes a transmit buffer and a complimentary buffer, wherein the transmit buffer is coupled to a electrical channel comprising two wires outside the integrated circuit, and the complimentary buffer is coupled to two banks of capacitors on the chip. In some embodiments, an input of the transmit buffer is coupled to a data input on the chip, and an input of the complementary buffer is coupled to a generated data that is calculated using an algorithm from the data input to the transmit buffer, the algorithm including:

(1) In a one bit per clock cycle operation, the algorithm is operable to invert every other bit in the data stream, and (2) In a multiple bits per cycle scenario, the algorithm is operable to either invert all even bits or invert all odd bits of an input data word.

In some embodiments, wherein each bank of the capacitors is a single capacitor, and in some embodiments each bank of the capacitors includes multiple capacitors. In some embodiments, wherein one node of each of one or more capacitors of the banks of capacitors is connected to switch, and in some embodiments, the switches connected to the one or more capacitors are programmable. In other embodiments, the one or more capacitors of the banks of capacitors are not connected to switches and remain coupled to the complementary buffer. In some embodiments, the capacitors of the banks of capacitors may include parasitic capacitance of a circuit.

In some embodiments, the data input to the chip may be a single bit or a word of data. In some embodiments, if the data input is a word, the transmit buffer includes a first serializer, and the complementary buffer includes a second serializer, wherein data inputs to the second serializer are defined by the algorithm.

Figure 9A:
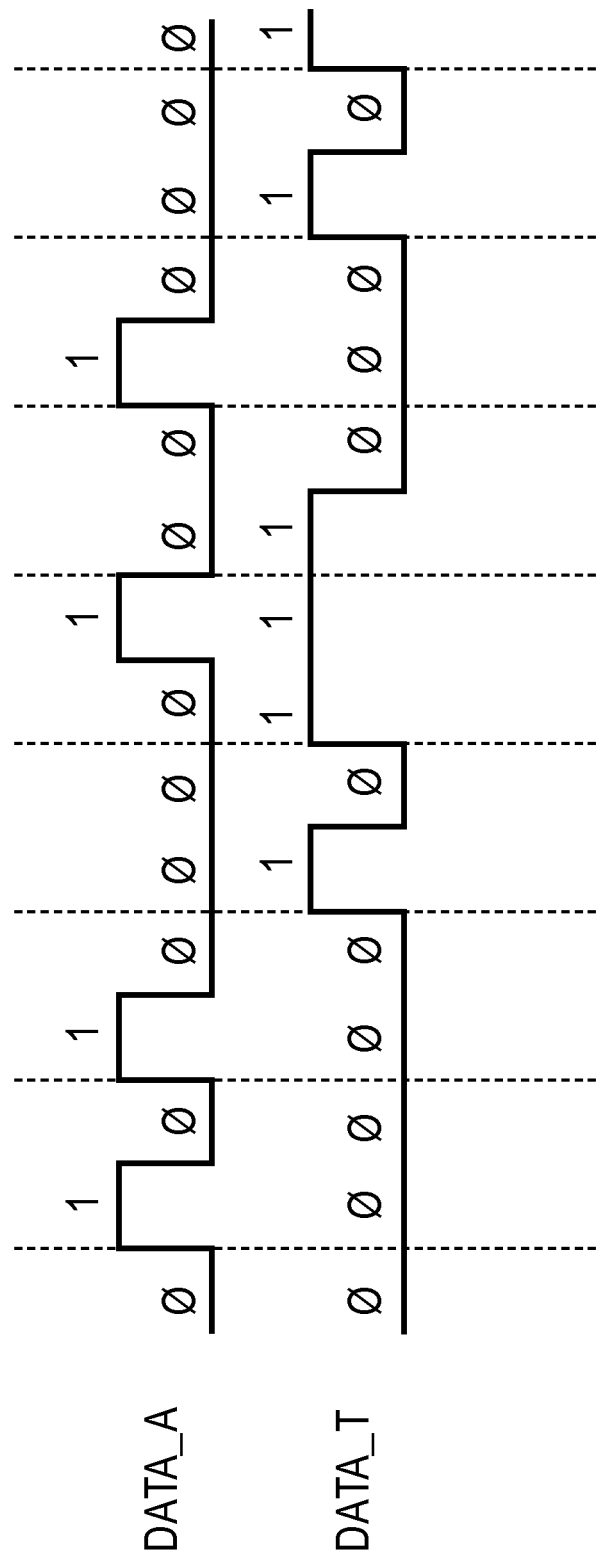
FIG. 9A illustrates an example of complementary data for current injection according to an embodiment.

FIG. 9A illustrates an example of complementary data for current injection according to an embodiment. In this illustration, Data_A represents actual data and Data_T represents complementary data. In the relationship between actual data and the complementary data, each odd bit (the first bit, the third bit, etc.) of the complementary data matches the respective odd bit of actual data, and each even bit (the second bit, the fourth bit, etc.) of the complementary data is inverted from the respective bit of the actual data. In this manner, the generated Data_T will operate to remain constant when the actual data Data_A toggles between '0' and '1' or between '1' and '0' and to toggle when the actual data does not toggle.

Figure 9B:
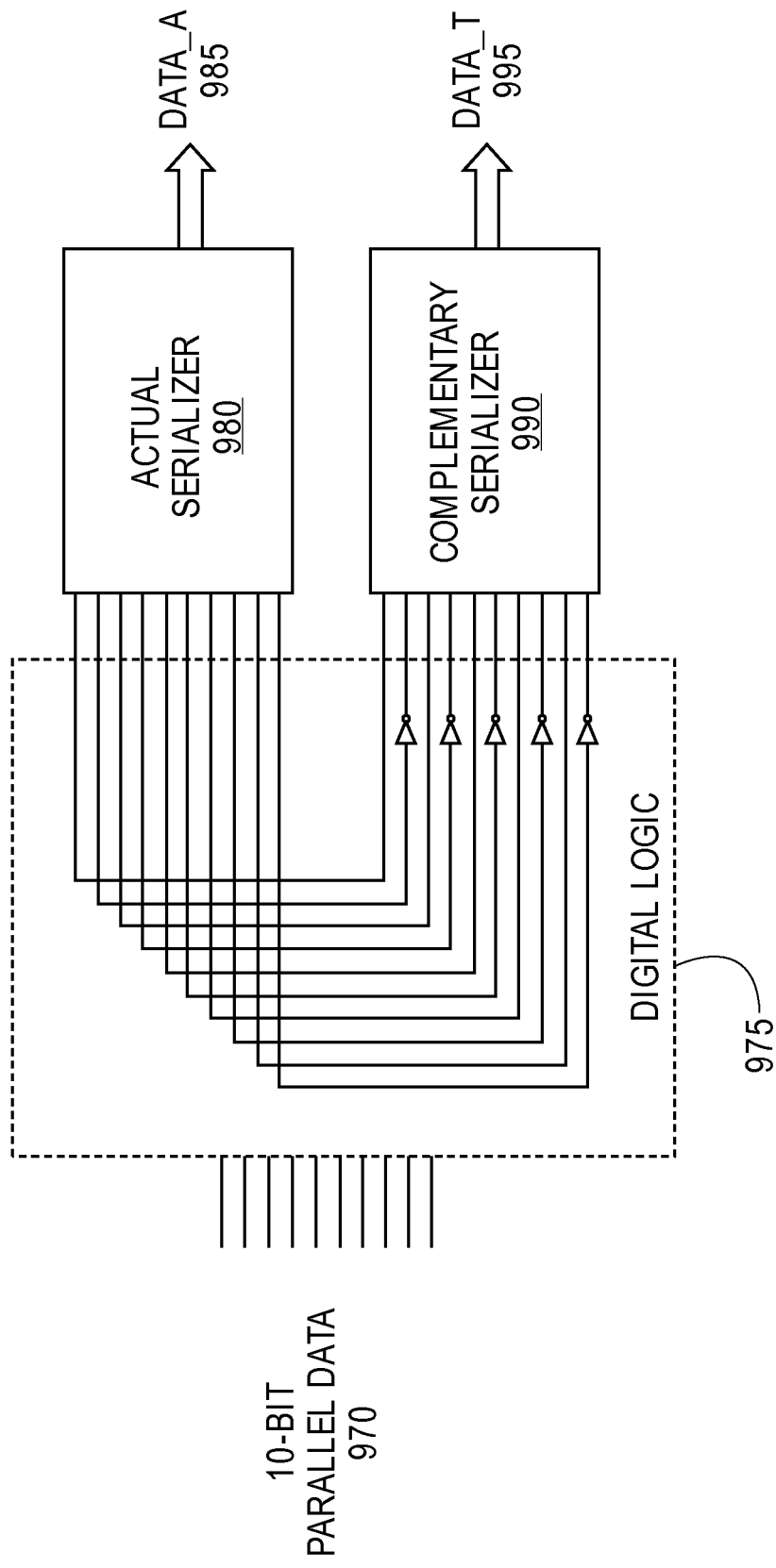
FIG. 9B illustrates an embodiment of a system to generate complementary data for a given data.

FIG. 9B illustrates an embodiment of a system to generate complementary data for a given data. In some embodiments, FIG. 9B illustrates a system for producing complementary data in a serializer, where such complementary data may be utilized to provide for current injection. In this illustration, parallel data 970, illustrated as 10-bit parallel data in this example, is received by digital logic 975. In some embodiments, the digital logic 975 is operable to direct via the upper set of lines an unaltered set of data to a first serializer referred to as an actual serializer 980, which produces the serial data stream of actual data Data_A 985. In some embodiments, the digital logic 975 alters a second set of data via the lower set of lines, where every other line includes an inverter, to generate a complementary set of data which includes odd data bits that are unaltered and even data bits that are inverted. In some embodiments, the complementary set of data is provided to a second serializer referred to as a complementary serializer 990, which will produce complementary data stream Data_T 995, where the complementary data stream 995 thus will toggle when the actual data stream 985 does not toggle.

In some embodiments, an apparatus, system, or method further includes an element to improve an output transition time of a driver. The speed of a conventional transmitter, such as an HDMI transmitter, is limited by the RC time constant, where R is the total termination resistance and C is the capacitance at the output pin, the capacitance C being mainly comprised of package capacitance and any board capacitance, including the ESD (electrostatic discharge) diode capacitance.

In some embodiments, a method for updating a state of programmable elements for connecting capacitors for a pre-driver includes:

(1) Obtaining a capacitance value for two banks of capacitors of an integrated circuit (IC) chip to provide current injection for a complementary driver for a differential data driver, wherein the IC chip includes a transmit buffer and a complementary buffer, the complementary buffer being coupled to the two banks of capacitors, each bank of capacitors including a plurality of capacitors, where each of one or more of the plurality of capacitors is coupled with a programmable device; and (2) Updating a state of each of the programmable devices to establish the capacitance of two banks of capacitors, wherein the state of each programmable either enables or disables a connection of an associated capacitor.

In some embodiments, the first and second pre-drivers are to drive data complimentary to each other.

In some embodiments, the status of such programmable devices can be updated when the transmit buffer is functional and sending data. In some embodiments, the programmable devices can change states only when the transmit data contains at least two bits of logic '0' or two bits of logic '1' in sequence.

Figure 10:
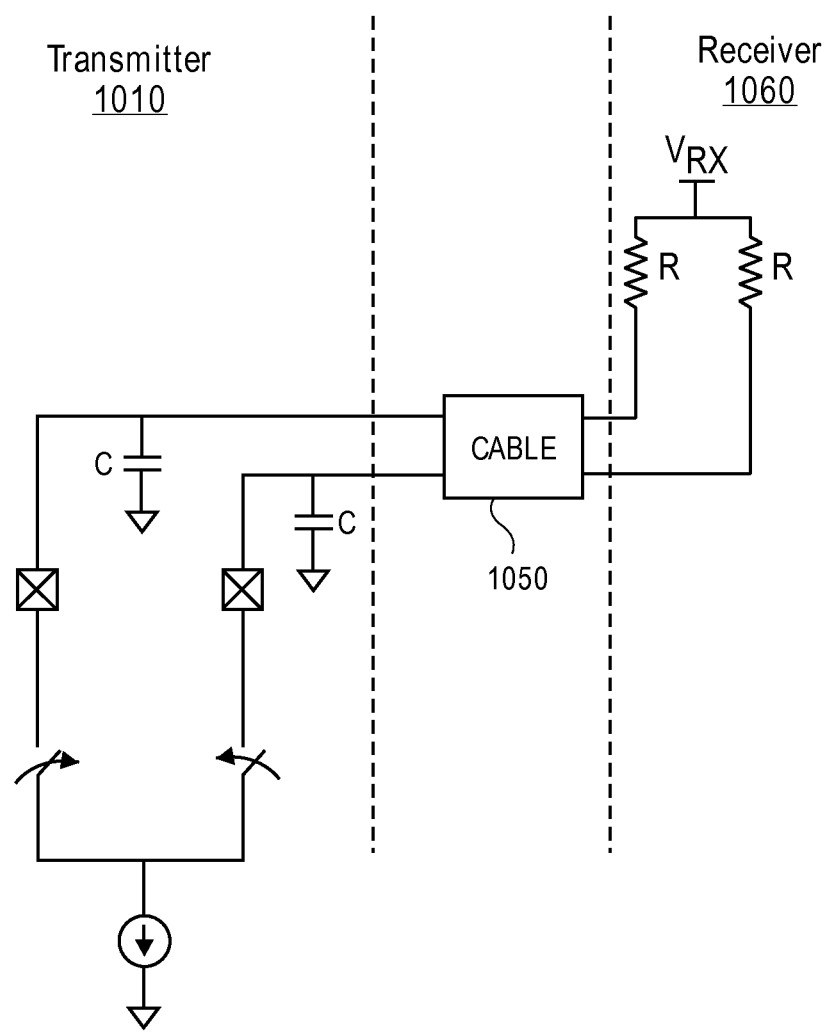
FIG. 10 illustrates a system including a transmitter coupled with a receiver.

FIG. 10 illustrates a system including a transmitter coupled with a receiver. The speed of a conventional transmitter 1010, such as, for example, an HDMI transmitter, in transmitting to a receiver 1060 is limited by an RC time constant, where R is the total termination resistance (which is generally the same as the characteristic impedance of the transmission line, which is cable 1050 in this illustration) and C is the capacitance at the output pin. The capacitance C is mainly comprised of package capacitance and any board capacitance, including the ESD diode capacitance. If the total capacitance on the pin is high, the rise/fall time is high and the requirements for the driver may not be met.

Conventional approaches to addressing the RC limitation may include:

(1) Reducing the resistance R—For example, internal termination resistance is added to reduce the total differential impedance seen between the differential outputs. However, DC ground current then is required to be increased to maintain DC levels. In such conventional operations, the transmission speed is still limited by the RC time constant at the output pin.

In order to reduce the effective R (resistance), it is possible to, for example, provide a termination resistance at the driver between output terminals TP (positive) and TN (negative). The lower limit on the resistance in such cases will be set by signal swing and power specifications. In one example, for an HDMI system, the lower limit is approximately 250 Ohms, which leads to an effective R of roughly 40 Ohms. Attempting to provide a resistance of less than this value is not possible because the VH specification would be violated.

Placing a termination resistor into a system leads to more power consumption even when there is no data toggling. Further, in most standards there is a lower limit on resistance R. DC ground current has to be increased to maintain DC levels. The transmission speed is still limited by the RC time constant at the output pin. An effective mechanism would instead be required to reduce both rise time and fall time, without increasing DC currents (2) Pre-emphasis—Another conventional approach to addressing RC limitation is pre-emphasis. However, there are practical limitations on pre-emphasis. In an example of the HDMI architecture, pre-emphasis reduces the fall time of a signal but does not affect the rise time. In such an architecture, because of the difference in rise and fall time, there is a large variation in common mode voltage. The difference in rise time and fall time also results in large skew between differential signals and can increase the EMI (electromagnetic interference).

Further, it is possible to momentarily increase the current at the time of transition, which is the commonly known as pre-emphasis/de-emphasis technique. However, pre-emphasis/de-emphasis results in certain difficulties. The technique may violate certain standards requirements, such as the VH/VL specifications for HDMI at transmitter output even though the receiver eye improves, or may move a signal into common mode. For this reason, pre-emphasis/de-emphasis technique is a difficult solution to implement for transmitters such as an HDMI transmitter.

(3) Reduction in C—A system may provide for reducing the effective lumped C (capacitance) of the driver. While the reduction of capacitance may be effective in addressing RC limitations, this process may be difficult and expensive to implement, particularly if ESD diodes are present on the link. Reducing capacitance generally will result in the package, board, and other components being more expensive to produce. The reduction of the capacitance may face excessive load due to protection devices, switches, and other elements present. Further, on multiplexed paths (where there are multiple drivers on the same connection) the reduction of capacitance C may not be feasible.

(4) Pre-charge Capacitors—Another method includes pre-charge capacitors dumping their charge into the output pads at rising/falling edges of the data. However, such circuits are complex and require large capacitances. In addition, momentarily the capacitance on the pads increases and switching transients are thus expected.

In some embodiments, an apparatus, system, or method addresses RC limitations by reducing the effective capacitance seen at the output. In some embodiments, a mechanism utilizes an internal capacitance (Cint) to provide charge to the external capacitance (C) when the output node is supposed to go high, and subtract charge when the output node is supposed to go low. Thus, this internal capacitance provides a considerable portion of charge/discharge current.

Figure 11:
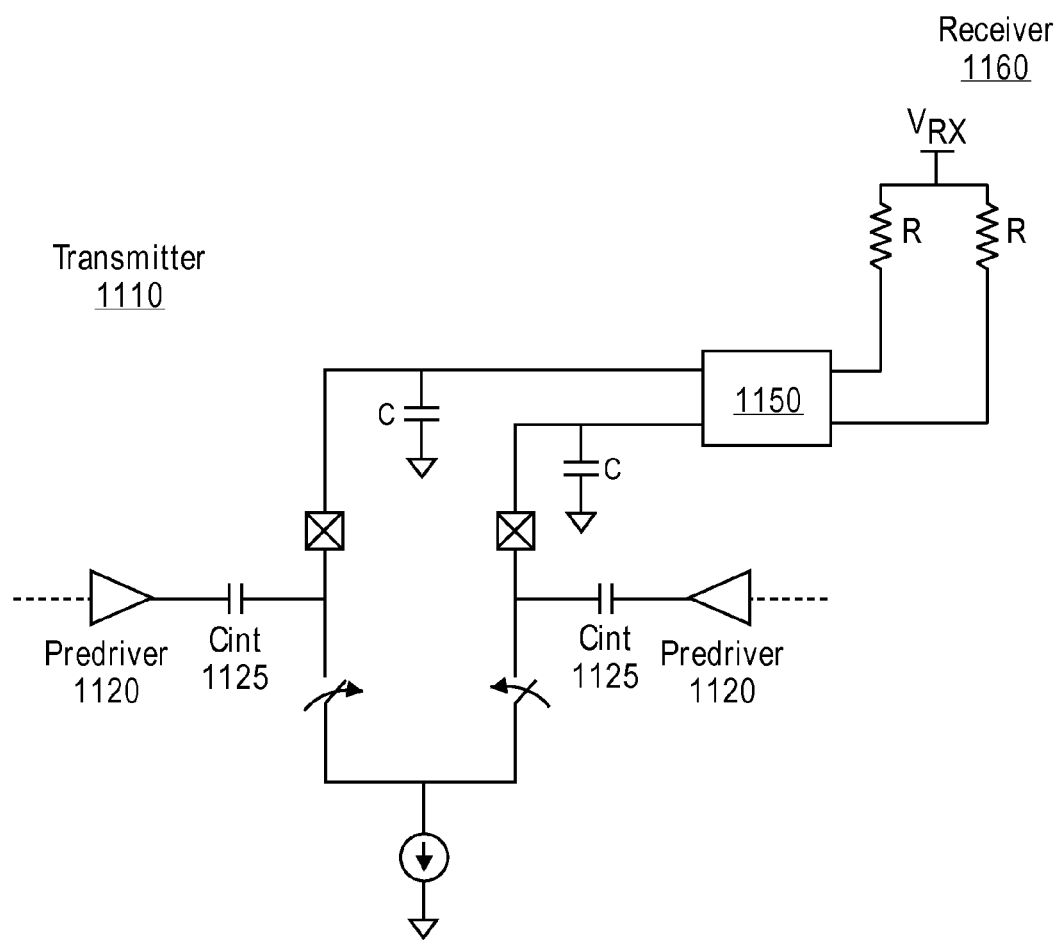
FIG. 11 illustrates an embodiment of an apparatus or system including reduction of effective capacitance of a driver.

FIG. 11 illustrates an embodiment of an apparatus or system including reduction of effective capacitance of a driver. In this illustration, a transmitter 1110 is coupled with a receiver 1160 via a cable 1150 or other connection. The transmitter 1110 and receiver 1160 may, for example, be HDMI compatible devices. In some embodiments, an internal capacitance (Cint) 1125 coupled with a pre-driver 1120 is utilized to provide charge to the external capacitance (C) when the output node goes high, and subtract charge when the output node should go low. In some embodiments, the internal capacitance provides a significant portion of charge/discharge current, thereby by moderating the effective capacitance at the output of the transmitter 1110.

Figure 12:
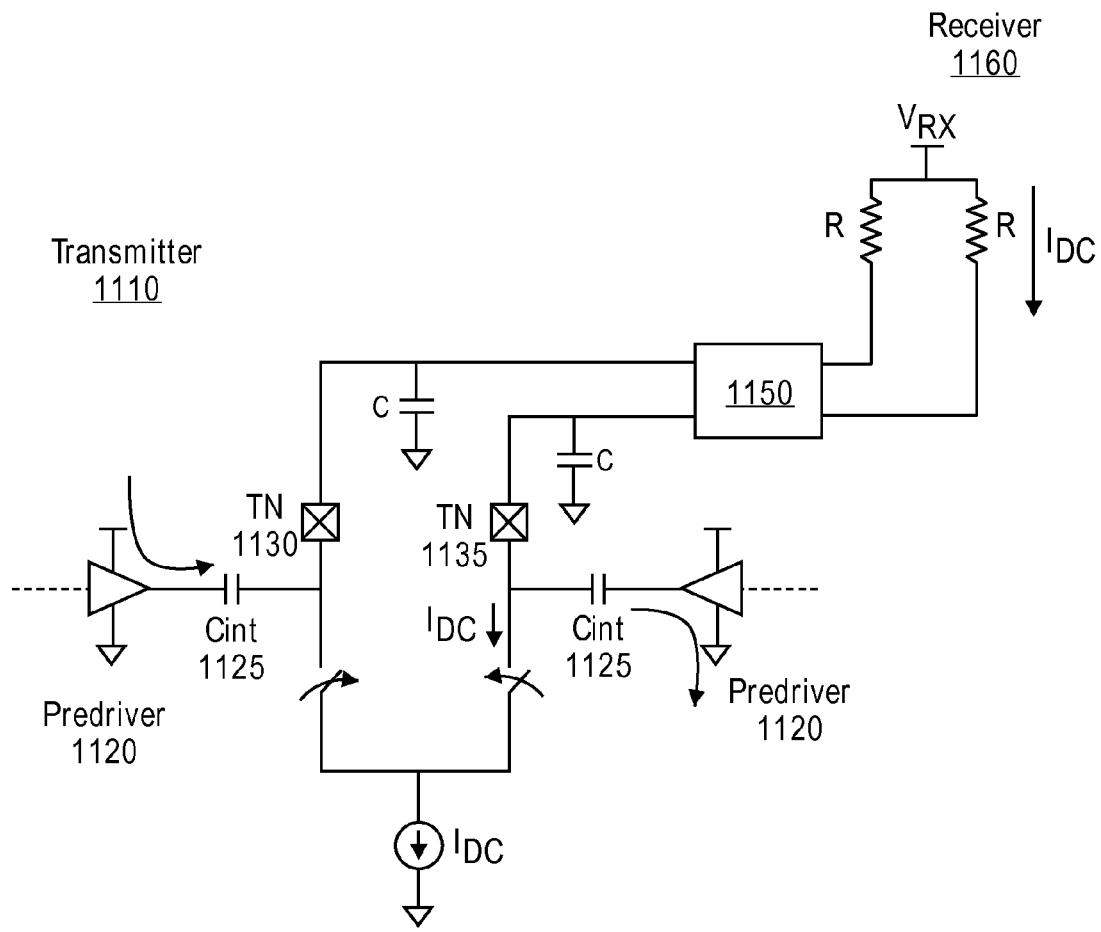
FIG. 12 illustrates shows an embodiment of an apparatus or system during charging and discharging of nodes.

FIG. 12 illustrates shows an embodiment of an apparatus or system during charging and discharging of nodes. In this illustration, the transmitter 1110 is again coupled with the receiver 1160 via the cable 1150 or other connection, and the internal capacitance Cint 1125 is coupled with a pre-driver 1120. In some embodiments, the transmitter 1110 is illustrated as charging node TP 1130 and discharging node TN 1135. In this illustration, nodes TP 1130 and TN 1135 may be, for example, the positive and negative nodes (or output terminals) of an HDMI port. In some embodiments, for the charging node (TP), Cint provides charge to C. For the discharging node, Cint comes in parallel with C, thus the charge on C gets distributed between C and Cint.

In some embodiments, because the effective capacitance at the output of the transmitter 1110 is now reduced, the transmitter 1110 is capable of transmitting data at higher rates than those otherwise limited by the RC time constant.

Figure 13:
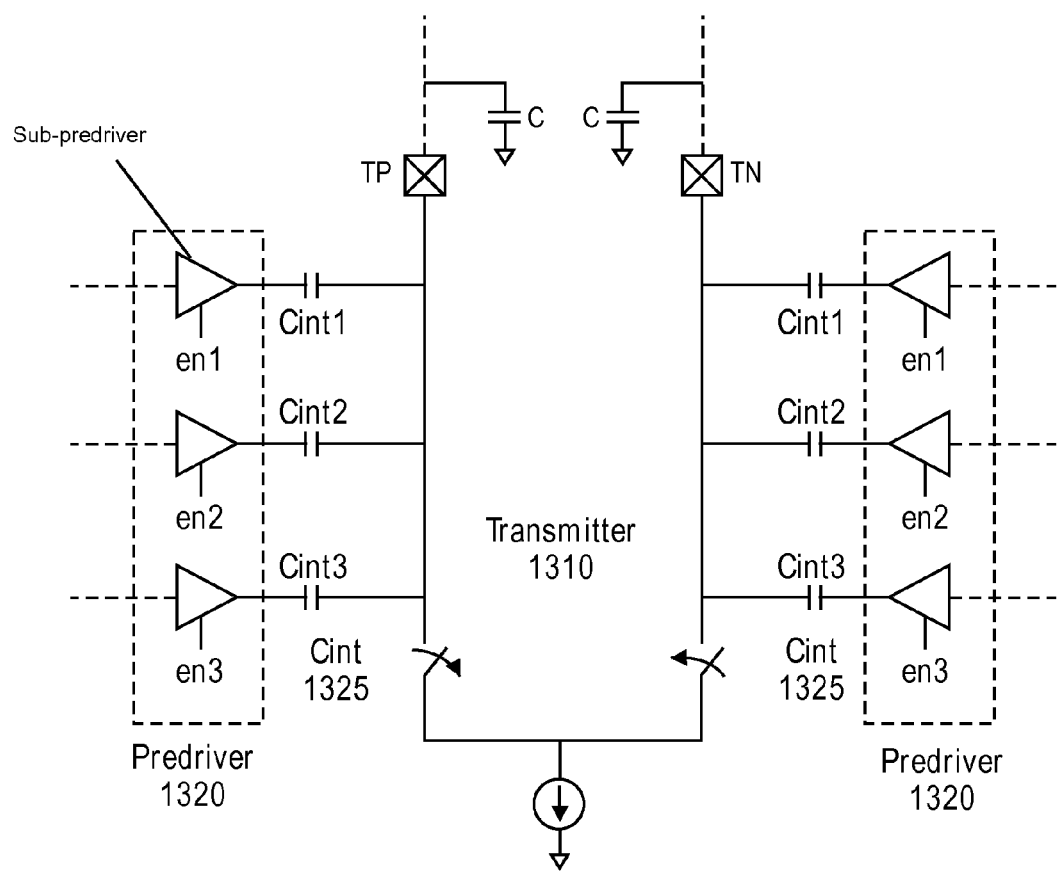
FIG. 13 illustrates an embodiment of an apparatus or system including a programmable internal resistance.

FIG. 13 illustrates an embodiment of an apparatus or system for driving data on a differential channel including a programmable internal resistance. In some embodiments, the internal capacitance 'Cint' 1325 of a transmitter 1310 (where transmitter 1310 is a high speed differential driver circuit) may be programmable, and thus allows modification of the internal capacitance as needed. In some embodiments, depending on the total capacitance C obtained on TP/TN nodes (where TP is a first output terminal and TN is a second output terminal), 'Cint' may be selected for an optimized setting.

In some embodiments, a pre-driver for 'Cint' 1325 may be constructed utilizing one or more inverters 1320, where the inverters are enabled by appropriate enable signals. In this illustration, en1 enables or disables the pre-driver for Cint1, en2 enables or disables the pre-driver for Cint2, and en3 enables or disables the pre-driver for Cint 3.

In some embodiments, the inverters 1320 may be followed by resistances (which are not illustrated here) to control the rise time and fall time at the pre-driver output, and hence to control the HDMI (or other transmitter) output. In some embodiments, the resistances may be programmable to allow for adjustment of the circuit. In some embodiments, the programmability of internal capacitance may be achieved by tristating the pre-drivers driving the internal capacitance or by adding switches in series with the pre-driver resistances.

In an implementation, the programmable internal capacitance Cint 1325 may allow for a fast rise/fall time implementation with relatively large capacitive loads. In some embodiments, based on the board capacitance and other factors, optimization of rise time and fall time may be implemented after production, which is generally not possible in conventional designs.

In some embodiments, internal capacitance portion of a circuit may be turned off at lower speeds to save power, such as by disabling each of the pre-drivers 1320. In some embodiments, addition of programmable internal capacitance on the transmitter pads allows for controlling rise times and fall times of a transmitted signal. In some embodiments, the internal capacitances are driven by inverters or inverters followed by resistances.

In some embodiments, the programmability of internal capacitance may be achieved by tristating the pre-drivers driving the internal capacitance or by adding switches in series with the pre-driver resistances.

In some embodiments, each pre-driver includes one or more capacitors, a first end of each capacitor being connected to the output of the pre-driver and a second end of each of the capacitors being connected to a sub-pre-driver circuit. In some embodiments, each sub-pre-driver circuit may output a logic '0', a logic '1', or a high-impedance state, wherein one or more of the sub-pre-driver circuits are operable to enter into the high-impedance state before a start of data communication and are prohibited to enter into the high-impedance state during data communication. In some embodiments, each sub-pre-driver circuit that is not in the high-impedance state outputs logic '1' when the associated pre-driver is driving a logic '1' and outputs logic '0' when the associated pre-driver is driving logic '0', and the transitions of sub-pre-driver circuits of a pre-driver from logic '0' to logic '1' and from '1' to '0' are synchronized with each other. In some embodiments, in a circuit in which a first pre-driver is coupled with a first output terminal and a second pre-driver is coupled with a second output terminal, the first pre-driver is to output a logic '1' on the first terminal when the differential high speed driver circuit is driving a logic '1' on the first terminal, and the first pre-driver is to output a logic '0' on the first terminal when the differential high speed driver circuit is driving a logic '0' of the first terminal. In some embodiments, the first pre-driver and the second pre-driver are to drive data complimentary to each other.

Figure 13A:
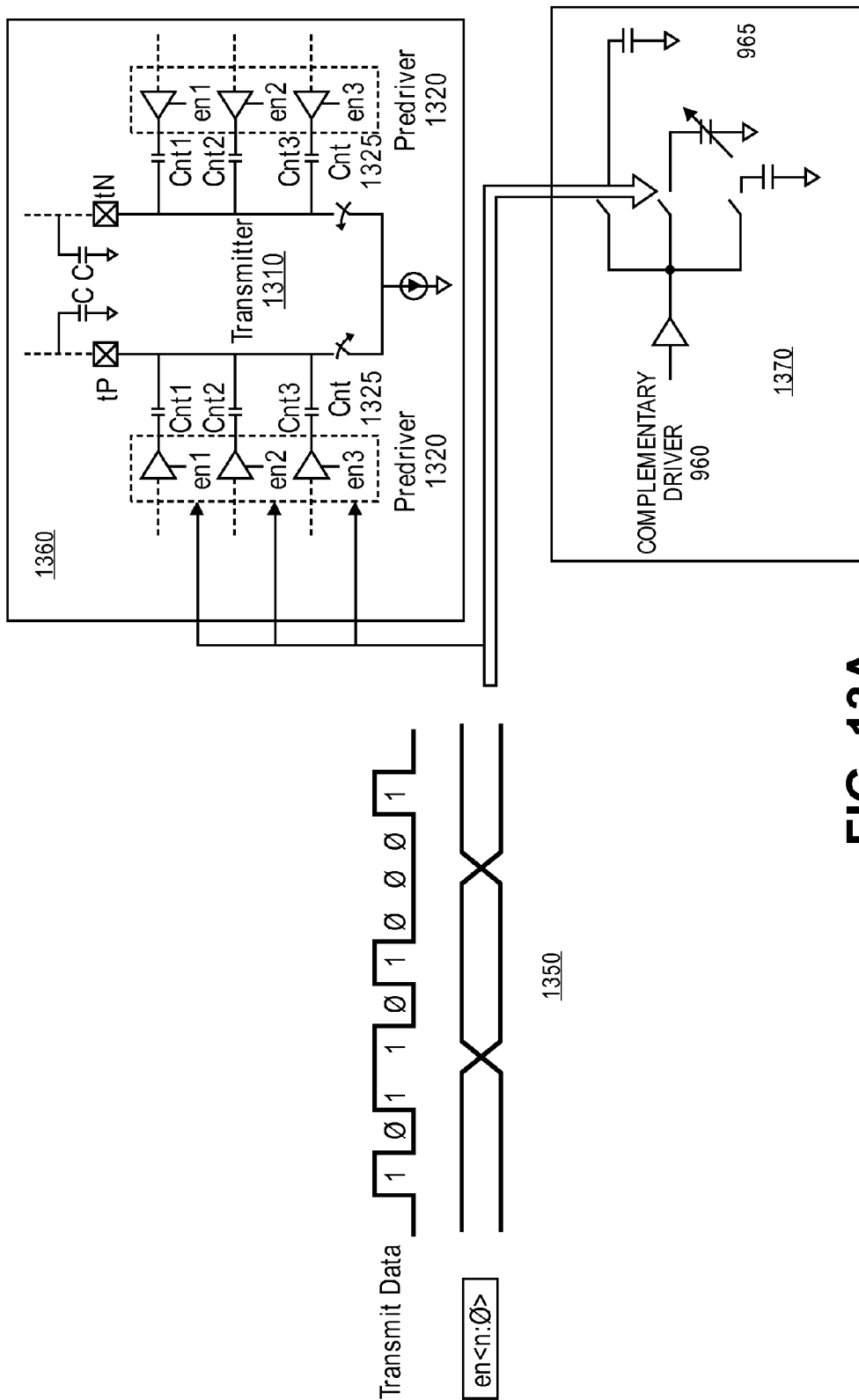
FIG. 13A illustrates an embodiment of a system to update the states of programmable switches.

FIG. 13A illustrates an embodiment of a system to update the states of programmable switches. In some embodiments, a system provides for updating the status, or settings, of programmable drivers or switches. In operation, an integrated circuit may need to change the status of programmable switches or drivers, including circumstances in which the device is in operation. In some embodiments, a system provides for a change in status of a programmable switch or driver in which transmitter data output does not become corrupted when such change in status takes place.

In some embodiments, a change in status for a programmable driver or switch of a system is implemented in the system when there is no transition in the transmitted data. In some embodiments, if a change in status of one or more programmable drivers or switches is requested, an update to the status of the drivers of switches occurs only when at least two '0's or two '1's (two of a first logical value or two of a second logical value) are present in sequence in a data stream.

In the illustration provided in FIG. 13A, a stream of Transmit Data includes a series of '0' and '1' values. In some embodiments, upon two or more of a logical value occurring in sequence, an enable signal (en<n:0>) 1350 is generated, where the enable signal indicates a time when a change in status of a programmable switch or driver may occur. In some embodiments, data may be input into a system with a programmable input resistance 1360, such as illustrated in FIG. 13, where a pre-driver for 'Cint' 1325 includes a sub-pre-driver circuit utilizing one or more inverters 1320, the inverters being enabled by appropriate enable signals. In some embodiments, the enable signal is provided to a complementary driver circuit 1370 including a complementary driver 960 coupled with a bank of capacitors 965, wherein the complementary driver 960 provides provide current injection when a main driver does not toggle.

Figure 14:
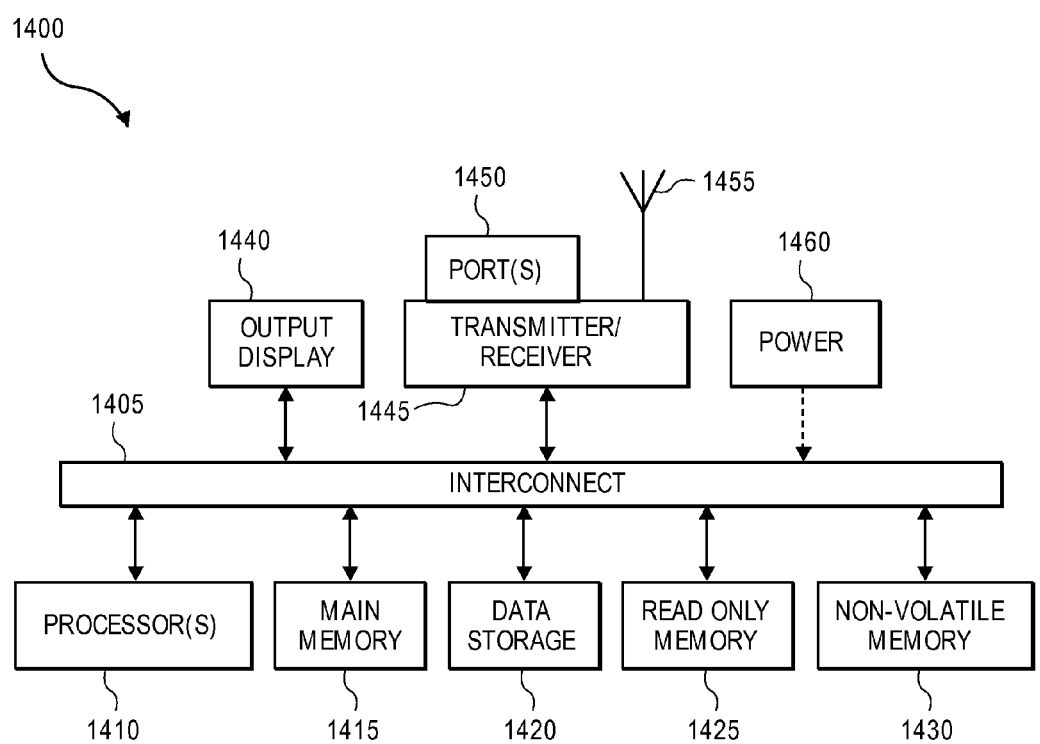
FIG. 14 illustrates an embodiment of an electronic device.

FIG. 14 illustrates an embodiment of an electronic device. In this illustration, certain standard and well-known components that are not germane to the present description are not shown. In some embodiments, a device 1400 may be a sink device compatible with a first protocol, such as an MHL sink device, that may receive a cable connection from another device. In some embodiments, the device 1400 may be a source device connected via cable to a device.

Under some embodiments, the device 1400 comprises an interconnect or crossbar 1405 or other communication means for transmission of data. The data may include various types of data, including, for example, audio-visual data and related control data. The device 1400 may include a processing means such as one or more processors 1410 coupled with the interconnect 1405 for processing information. The processors 1410 may comprise one or more physical processors and one or more logical processors. Further, each of the processors 1410 may include multiple processor cores. The interconnect 1405 is illustrated as a single interconnect for simplicity, but may represent multiple different interconnects or buses and the component connections to such interconnects may vary. The interconnect 1405 shown in FIG. 14 is an abstraction that represents any one or more separate physical buses, point-to-point connections, or both connected by appropriate bridges, adapters, or controllers. The interconnect 1405 may include, for example, a system bus, a PCI or PCIe bus, a HyperTransport or industry standard architecture (ISA) bus, a small computer system interface (SCSI) bus, a TIC (12C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 1400 further comprises a random access memory (RAM) or other dynamic storage device as a main memory 1415 for storing information and instructions to be executed by the processors 1410. Main memory 1415 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 1400 also may comprise a read only memory (ROM) 1425 or other static storage device for storing static information and instructions for the processors 1410. The device 1400 may include one or more non-volatile memory elements 1430 for the storage of certain elements.

Data storage 1420 may also be coupled to the interconnect 1405 of the device 1400 for storing information and instructions. The data storage 1420 may include a magnetic disk or other memory device. Such elements may be combined together or may be separate components, and utilize parts of other elements of the device 1400.

The device 1400 may also be coupled via the interconnect 1405 to an output display or presentation device 1440. In some embodiments, the display 1440 may include a liquid crystal display (LCD), plasma display, or any other display technology for displaying information or content to an end user. In some environments, the display 1440 may include a touch-screen that is also utilized as at least a part of an input device. In some environments, the display 1440 may be or may include an audio device, such as a speaker for providing audio information, including the audio portion of a television program.

One or more transmitters or receivers 1445 may also be coupled to the interconnect 1405. In some embodiments, the device 1400 may include one or more ports 1450 for the reception or transmission of data In some embodiments, a transmitter 1445 is a transmitter including circuit elements to counter transmitter circuit limitations, where the elements include programmable elements to adjust transmitter performance. In some embodiments, the transmitter 1445 includes elements for current injection to offset current variation in a circuit as signals are toggled, and thus to reduce data dependent jitter. In some embodiments, an apparatus, system, or method includes the provision of internal capacitance to modify the effective capacitance seen at an output, and thus to affect an RC time constant.

The device 1400 may further include one or more antennas 1455 for the reception of data via radio signals. The device 1400 may also comprise a power device or system 1460, which may comprise a power supply, a battery, a solar cell, a fuel cell, or other system or device for providing or generating power. The power provided by the power device or system 1460 may be distributed as required to elements of the device 1400.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

In some embodiments, an apparatus for driving data on a differential channel includes a first output terminal and a second output terminal, the apparatus further including a differential driver circuit; and a first pre-driver and a second pre-driver, where each pre-driver has an output, wherein the first output terminal of the apparatus is coupled to the output of the first pre-driver, and the second output terminal of the apparatus is coupled to the output of the second pre-driver. In some embodiments: each pre-driver includes one or more capacitors, a first end of each capacitor being connected to the output of the pre-driver and a second end of each of the capacitors being connected to a sub-pre-driver circuit; each sub-pre-driver circuit may output a logic '0', a logic '1', or a high-impedance state; one or more of the sub-pre-driver circuits are operable to enter into the high-impedance state before a start of data communication and are prohibited from entering into the high-impedance state during data communication; each sub-pre-driver circuit that is not in the high-impedance state outputs logic '1' when the associated pre-driver is driving a logic '1' and outputs logic '0' when the associated pre-driver is driving logic '0', and the transitions of sub-pre-driver circuits of a pre-driver from logic '0' to logic '1' and from '1' to '0' are synchronized with each other; wherein the first pre-driver is to output a logic '1' on the first terminal when the differential high speed driver circuit is driving a logic '1' on the first terminal, and the first pre-driver is to output a logic '0' on the first terminal when the differential high speed driver circuit is driving a logic '0' of the first terminal; and the first and second pre-drivers are to drive data complimentary to each other.

In some embodiments, a transition from logic '0' to logic '1' of the first pre-driver and a transition from logic '0' to logic '1' of the differential high-speed driver circuit are synchronous.

In some embodiments, a transition from logic '1' to logic '0' of the first pre-driver and a transition from logic '1' to logic '0' of the differential high-speed driver circuit are synchronous.

In some embodiments, a transition from logic '0' to logic '1' of the first pre-driver and a transition from logic '1' to logic '0' of the second pre-driver are synchronous.

In some embodiments, a transition from logic '1' to logic '0' of the first pre-driver and a transition from logic '0' to logic '1' of the second pre-driver are synchronous.

In some embodiments, the first and second pre-drivers include the same number and size capacitors. In some embodiments, the first and second pre-drivers include the same type of sub-pre-driver circuits.

In some embodiments, the capacitors in the pre-driver circuits are equal in size and the sub-pre-drivers are equal in their drive strength.

In some embodiments, each capacitor of a pre-driver is coupled with a programmable switch.

In some embodiments, the first and second output terminals are: two pads of an integrated circuit (IC), two wires in a cable, or two printed circuit board (PCB) lines.

In some embodiments, the sub-pre-driver circuits are constructed using logic gates and CMOS (complementary metal-oxide semiconductor) buffers and wherein the differential driver is a CML (Current Mode Logic) driver.

In some embodiments, an apparatus includes: a transmit buffer and a complimentary buffer on an integrated circuit (IC) chip. In some embodiments: the transmit buffer is coupled to a electrical channel comprising two wires outside the integrated circuit, and the complimentary buffer is coupled to two banks of capacitors on the chip; an input of the transmit buffer is coupled to a data input on the chip, and an input of the complementary buffer is coupled to a generated data that is calculated using an algorithm from the data input to the transmit buffer. In some embodiments, the algorithm includes the following: in a one bit per clock cycle operation, the algorithm inverts every other bit in the data stream, and in a multiple bits per cycle scenario, the algorithm either inverts all even bits or it inverts all odd bits of an input data word.

In some embodiments, each bank of the capacitors is a single capacitor.

In some embodiments, each bank of the capacitors includes multiple capacitors.

In some embodiments, one node of each of one or more capacitors of the banks of capacitors is connected to a switch. In some embodiments, the switches connected to the one or more capacitors are programmable. In some embodiments, one or more other capacitors of the banks of capacitors are not connected to switches and remain coupled to the complementary buffer.

In some embodiments, data input to the chip may be a single bit or a word of data. In some embodiments, if the data input is a word, the transmit buffer includes a first serializer, and the complementary buffer includes a second serializer, wherein data inputs to the second serializer are defined by the algorithm.

In some embodiments, the capacitors of the banks of capacitors include capacitance implemented by parasitic capacitance.

In some embodiments, a method includes: obtaining a capacitance value for two banks of capacitors of an integrated circuit (IC) chip to provide current injection for a complementary driver for a differential data driver, wherein the IC chip includes a transmit buffer and a complementary buffer, the complementary buffer being coupled to the two banks of capacitors, each bank of capacitors including a plurality of capacitors, where each of one or more of the plurality of capacitors is coupled with a programmable device; and updating a state of each of the programmable devices to establish the capacitance of two banks of capacitors, wherein the state of each programmable device either enables or disables a connection of an associated capacitor. In some embodiments, the state of each of such programmable devices can be updated when the transmit buffer is functional and sending data; and the programmable devices can change states only when the transmit data contains at least two sequential bits of logic '0' or two sequential bits of logic '1'.

In some embodiments, one or more other capacitors of the banks of capacitors are not connected to programmable device and remain coupled to the complementary buffer.

In some embodiments, the method further includes choosing a capacitance value to provides a minimum data jitter value.

What is claimed is:

1. An apparatus comprising:
   a transmit buffer and a complimentary buffer on an integrated circuit (IC) chip; wherein the transmit buffer is coupled to an electrical channel comprising two wires outside the IC chip, and the complimentary buffer is coupled to two banks of capacitors on the IC chip;
   wherein an input of the transmit buffer is coupled to a data input on the IC chip, and an input of the complementary buffer is coupled to a generated data that is calculated using an algorithm from the data input to the transmit buffer, the algorithm including the following:
      in a one bit per clock cycle operation, the algorithm inverts every other bit in the data stream, and
      in a multiple bits per cycle scenario, the algorithm either inverts all even bits or it inverts all odd bits of an input data word.

2. The apparatus of claim 1, wherein each bank of the capacitors is a single capacitor.

3. The apparatus of claim 1, wherein each bank of the capacitors includes multiple capacitors.

4. The apparatus of claim 1, wherein one node of each of one or more capacitors of the banks of capacitors is connected to a switch.

5. The apparatus of claim 4, wherein the switches connected to the one or more capacitors are programmable.

6. The apparatus of claim 4, wherein one or more other capacitors of the banks of capacitors are not connected to switches and remain coupled to the complementary buffer.

7. The apparatus of claim 1, wherein data input to the IC chip may be a single bit or a word of data.

8. The apparatus of claim 7, wherein if the data input is a word, the transmit buffer includes a first serializer, and the complementary buffer includes a second serializer, wherein data inputs to the second serializer are defined by the algorithm.

9. The apparatus of claim 1, wherein the capacitors of the banks of capacitors include capacitance implemented by parasitic capacitance.

10. A method comprising:

obtaining a capacitance value for two banks of capacitors of an integrated circuit (IC) chip to provide current injection for a complementary driver for a differential data driver, wherein the IC chip includes a transmit buffer and a complementary buffer, the complementary buffer being coupled to the two banks of capacitors, each bank of capacitors including a plurality of capacitors, where each of one or more of the plurality of capacitors is coupled with a programmable device; and updating a state of each of the programmable devices to establish the capacitance of two banks of capacitors, wherein the state of each programmable device either enables or disables a connection of an associated capacitor;

wherein the state of each of such programmable devices can be updated when the transmit buffer is functional and sending data; and wherein the programmable devices can change states only when the transmit data contains at least two sequential bits of logic '0' or two sequential bits of logic '1'.

11. The method of claim 10, wherein one or more other capacitors of the banks of capacitors are not connected to a programmable device and remain coupled to the complementary buffer.

12. The method of claim 10, further comprising choosing a capacitance value to provides a minimum data jitter value.

* * * * *